United States Patent [19]

Steindam

[11] Patent Number: 5,615,103
[45] Date of Patent: Mar. 25, 1997

[54] AC-DC ADAPTOR/BATTERY ELIMINATOR

[76] Inventor: Richard A. Steindam, 57 Riverdale Rd., Valley Stream, N.Y. 11581

[21] Appl. No.: 550,383

[22] Filed: Oct. 30, 1995

[51] Int. Cl.$^6$ .................................................. H02J 4/00
[52] U.S. Cl. .................................................. 363/146
[58] Field of Search .................. 363/146, 21, 37; 307/43, 80, 128, 150, 151

[56] References Cited

U.S. PATENT DOCUMENTS 5,245,220  9/1993  Lee ............................................. 307/80

Primary Examiner—Aditya Krishnan

[57] ABSTRACT

An AC-DC adapter has a hollow enclosed electrically insulated housing. The housing has two parallel oppositely disposed surfaces. One surface has at least two spaced male openings for accommodating together a male electrical connector. The other surface has at least two spaced female openings for accommodating together a female connector. Each male opening is aligned with a corresponding one of the female openings. At least two elongated electrically conductive members, are utilized. Each member has a blade shaped element at one end which is adapted to be inserted detachably in a socket shaped element and has a socket shaped element at the other end which is adapted to receive detachably a blade shaped element. Each member is disposed in the housing and is aligned with a corresponding pair of male-female openings. The blade shaped element of each member extends outwardly in the corresponding male opening from the one surface. The socket shaped element of each member is recessed in the corresponding female opening in the other surface.

8 Claims, 1 Drawing Sheet

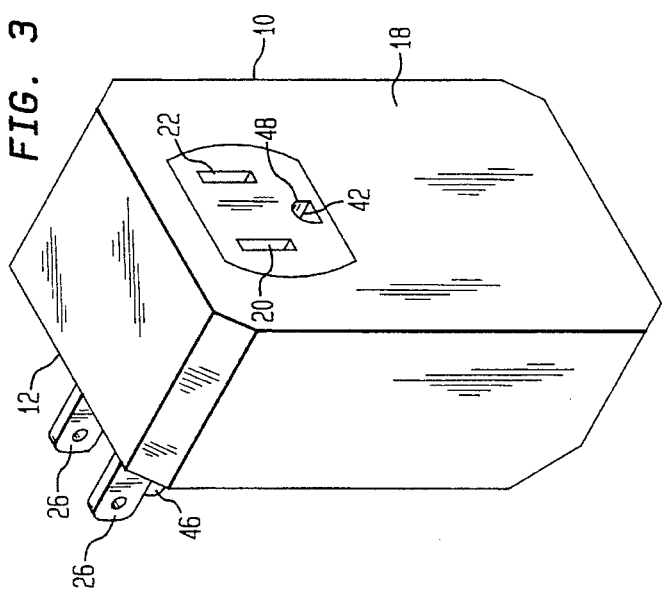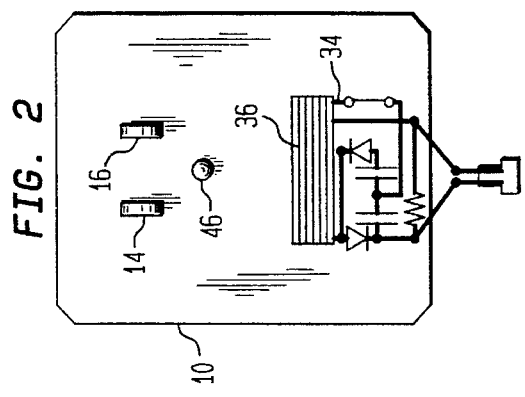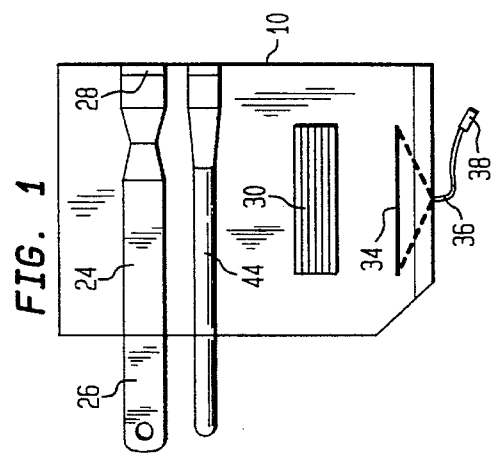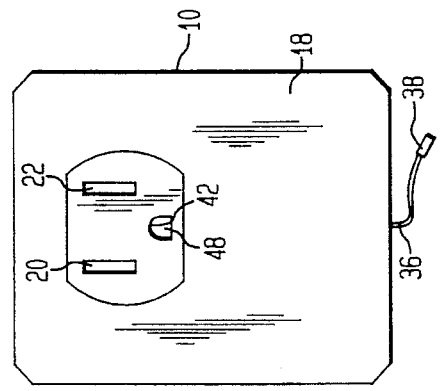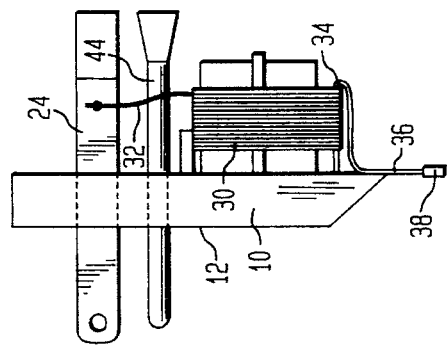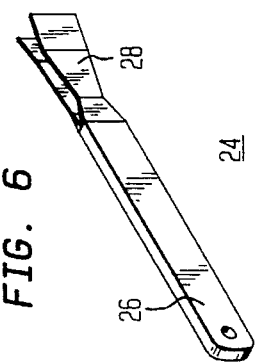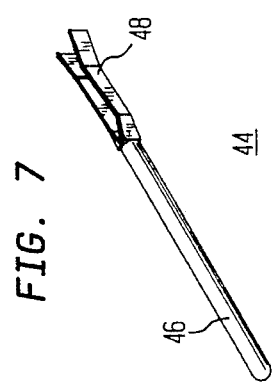

AC-DC ADAPTOR/BATTERY ELIMINATOR

BACKGROUND OF THE INVENTION

Many small electrical apparatus such as answering machines, calculators and the like operate on direct current. Typically, such apparatus will use batteries for this purpose. In addition, such apparatus can use a known device identified as an AC-DC adaptor in place of batteries. This device utilizes a small hollow enclosed electrically insulated housing. A male connector extends outward from the housing and is adapted to be detachably connected to a female connector which supplies alternating current power, such as 120 volts, 60 hertz. Inside the housing, the male connector is connected to a step down transformer which in turn is connected to a rectifier circuit. A length of coaxial cable has one end disposed inside the casing and coupled to the output of the rectifier circuit. The cable extends through the casing with the other end disposed outside of the casing. The outside end of the cable is connected to another type of connector which is adapted to be detachably connected to a small electrical apparatus, thus supplying suitable direct current to the apparatus and eliminating the need for batteries.

The adaptor housing is relatively large as compared to the female connector which provides the alternating current power. Hence when there are two or more female connectors disposed adjacent each other and closely spaced, the housing blocks access to adjacent connectors. It is often desirable to connect computers and other electrical apparatus which operate on alternating current to such adjacent connectors and the blockage of such connections must be awkwardly overcome by providing access to additional remotely disposed connectors supplying the desired alternating current.

The present invention eliminates the blockage problem by enabling the adaptor itself to provide an additional female connector for supplying alternating current to apparatus operating on alternating current.

SUMMARY OF THE INVENTION

Accordingly, it is an object of the present invention to provide a new and improved AC-DC adaptor which overcomes the blockage problem by incorporating an additional female connector for supplying alternating current while at the same time functioning otherwise as a conventional AC-DC adaptor.

Another object is to provide a new and improved AC-DC adaptor of the character indicated which can be manufactured easily and inexpensively.

Yet another object is to provide a new and improved AC-DC adaptor of the character indicated wherein an additional female connector disposed in the housing is integrally connected to the male connector.

These and other objects and advantages of this invention will either be explained or will become apparent hereinafter.

An AC-DC adaptor, in accordance with the principles of this invention, employs a hollow enclosed electrically insulated housing. The housing has a plurality of surfaces One surface has at least two spaced male openings for accommodating together a male electrical connector. Another surface has at least two spaced female openings for accommodating together a female connector. Each male opening is aligned with a corresponding one of the female openings.

The adaptor also employs at least two elongated electrically conductive members. Each member has a blade shaped element at one end which is adapted to be inserted detachably in a socket shaped element and has a socket shaped element at the other end which is adapted to receive detachably a blade shaped element. Each member is disposed in the housing and is aligned with a corresponding pair of male-female openings in the housing. The blade shaped element of each member extends outwardly in the corresponding male opening from the one surface and the socket shaped element of each member is recessed in the corresponding female opening in the other surface.

When the blade shaped elements are inserted into an external female connector energized with alternating current, this current is supplied to the socket shaped elements within the housing. Consequently, a second male connector attached to apparatus utilizing alternating current can be detachably inserted in the socket shaped elements in the housing, thus avoiding the blockage problem previously described.

A transformer, conventionally a step down transformer, can be disposed in the housing. The transformer has an input winding connected to two of the members and an output winding. The output winding can be connected to the input of a rectifier circuit disposed in the housing. The circuit has an output which can be connected within the housing to one end of a length of coaxial cable. This length extends outwardly through the housing and terminates in a connector means adapted to be detachably connected to apparatus utilizing direct current to supply the direct current thereto, thus eliminating need to use batteries to supply direct current to such apparatus.

While the two members carry electric current, it is sometimes necessary to provide a third electrically member as a ground connection. To this end, the third member can have a blade shaped element at one end and a socket shaped element at its other end. The one surface can accommodate a third male opening spaced from the other two male openings and the other surface can accommodate a third female opening spaced from the other two male openings. The third member can then be disposed in the housing with its blade shaped element extending out of the third male opening and its socket shaped element being recessed in the third female opening.

BRIEF DESCRIPTION OF THE DRAWINGS

FIG. 1 is a cut away side view of a preferred embodiment of the invention.

FIG. 2 is a cut away rear view thereof.

FIG. 3 is a front perspective view thereof.

FIG. 4 is a front view thereof.

FIG. 5 is a detail view of the electrical components as connected in circuit.

FIG. 6 is a perspective view of one type of electrical conductor used in the embodiment of FIG. 1.

FIG. 7 is a perspective view of another type of electrical conductor used in the embodiment of FIG. 1.

DETAILED DESCRIPTION OF PREFERRED EMBODIMENTS

As shown in FIGS. 1–7, an AC-DC adaptor has a hollow enclosed electrically insulated housing 10 having the general shape of a rectangular parallelpiped. The housing has two parallel oppositely disposed surfaces, one surface 12 having at least two spaced male openings 14 and 16 for accommodating together a male electrical connector, the other surface 18 having at least two spaced female openings 20 and 22 for accommodating together a female connector, each male opening being aligned with a corresponding one of the female openings. Each of these openings has the same general shape of a rectangle. The adaptor has at least first and second like elongated electrically conductive members 24. Each member has a blade shaped element 26 at one end which is adapted to be inserted detachably in a socket shaped element. Each element 26 in cross section has the general shape of a rectangle. Each member has a socket shaped element 28 at the other end which is adapted to receive detachably a blade shaped element. Each member is disposed in the housing and is aligned with a corresponding pair of male-female openings with its blade shaped element extending outwardly in the corresponding male opening from the one surface and its socket shaped element being recessed in the corresponding female opening in the other surface.

A step down transformer 30 is disposed in the housing, the transformer having an input winding connected at 32 to each of members 24 and an output winding connected to a rectifier circuit 34. Circuit 34 has an input coupled to the output winding of the transformer and an output connected to one end of a coaxial cable 36. The rectifier circuit shown in detail in FIG. 2 is well known in the art, being illustrated for example in FIG. 6–7 in a standard textbook, "The American Electricians Handbook." The cable extends through the housing to an exposed end terminating in connector means 38.

Transformer 30, circuit 34, cable 36 and connector means, being well known in the art and being connected in conventional manner, are not shown in detail herein.

The two male openings are parallel to each other and the two female openings are parallel to each other. Surface 12 has a third male opening 40 offset from openings 14 and 16 and is disposed therebetween. Surface 18 has a third female opening 42 offset from openings 20 and 22 and is disposed therebetween. Openings 40 and 42 are aligned and each has the general shape of a circle.

The adaptor further includes a third elongated electrically conductive member 44 having a blade shaped element 46 at one end which is adapted to be inserted detachably in a socket shaped element and having a socket shaped element 48 at the other end which is adapted to receive detachably a blade shaped element. The third member is disposed in the housing and is aligned with the corresponding pair of male-female openings with its blade shaped element extending outwardly in the corresponding third male opening from the one surface and its socket shaped element being recessed in the corresponding third female opening in the other surface. The blade shaped element of the third member has in cross section the general shape of a circle.

The third member conventionally serves as a ground. In certain applications, the third member is not necessary and can be eliminated so that only the first and second members are retained in the housing.

While the invention has been described with particular reference to the preferred embodiment, the protection sought is to be limited only by the terms of the claims which follow.

What is claimed is:

1. An AC-DC adaptor comprising:
   first and second identical elongated electrically conductive members, each member having a blade shaped element extending longitudinally at one end and having a longitudinally extending socket shaped element at an opposite end;
   a hollow enclosed electrically insulated housing, said housing having at least two opposite surfaces, one surface having at least two spaced slotted openings, the opposite surface having at least two spaced slotted openings, each slotted opening in one surface being aligned with a corresponding slotted opening in the opposite surface to form an aligned pair of openings, each of the first and second members extending through said housing and disposed between a corresponding one of said aligned opening pairs, the socket element of said each member being disposed in the opening of the aligned pair in said one surface, the blade element of said each member being disposed in the slotted opening of the aligned pair in said opposite surface and extending out of the housing whereby the two blade elements extending out of the opposite surface of the housing can be removably engaged with a female outlet connected to a source of alternating current and a male connector can be detachably engaged with the socket elements in the openings in said one surface so that electrical current can flow from the female outlet through the housing into the male connector.

2. The adapter of claim 1 wherein the slots in each of the two surfaces are parallel and are horizontally aligned, each of said surfaces being provided with a third circular opening which is offset from the aligned slots and is disposed therebetween, the third openings being aligned, the adapter further including an elongated electrically conductive third member having an elongated blade shaped element at one end and an elongated socket shaped element at its other end, the third member extending in the housing between the aligned third openings, with the blade shaped element extending out of the same opposite side from which the blade elements of the first and second members extend, the socket shaped element being disposed in the third opening in the said one side in which the socket shaped elements of the first and second members are disposed.

3. The adaptor of claim 1 further including a step down transformer disposed in the housing, the transformer having an input winding connected to two of said members and an output winding.

4. The adaptor of claim 3 further including a rectifier circuit having an input coupled to the output winding of the transformer and an output.

5. The adaptor of claim 4 further including a length of coaxial cable having one end disposed inside the housing and coupled to the output of the rectifier circuit, said length extending through the casing with the other end disposed outside of the housing.

6. The adapter of claim 5 further including connector means connected to the other end of said length and adapted for detachable connection to a device operable on direct current.

7. The adaptor of claim 2 wherein each of the blade shaped elements of said first and second members in cross section has the general shape of a rectangle.

8. The adaptor of claim 7 wherein the blade shaped element of the third member in cross section has the general shape of a circle.

* * * * *